April 7, 1931.  L. M. WOOLSON  1,799,271
INTERNAL COMBUSTION ENGINE
Filed July 7, 1926
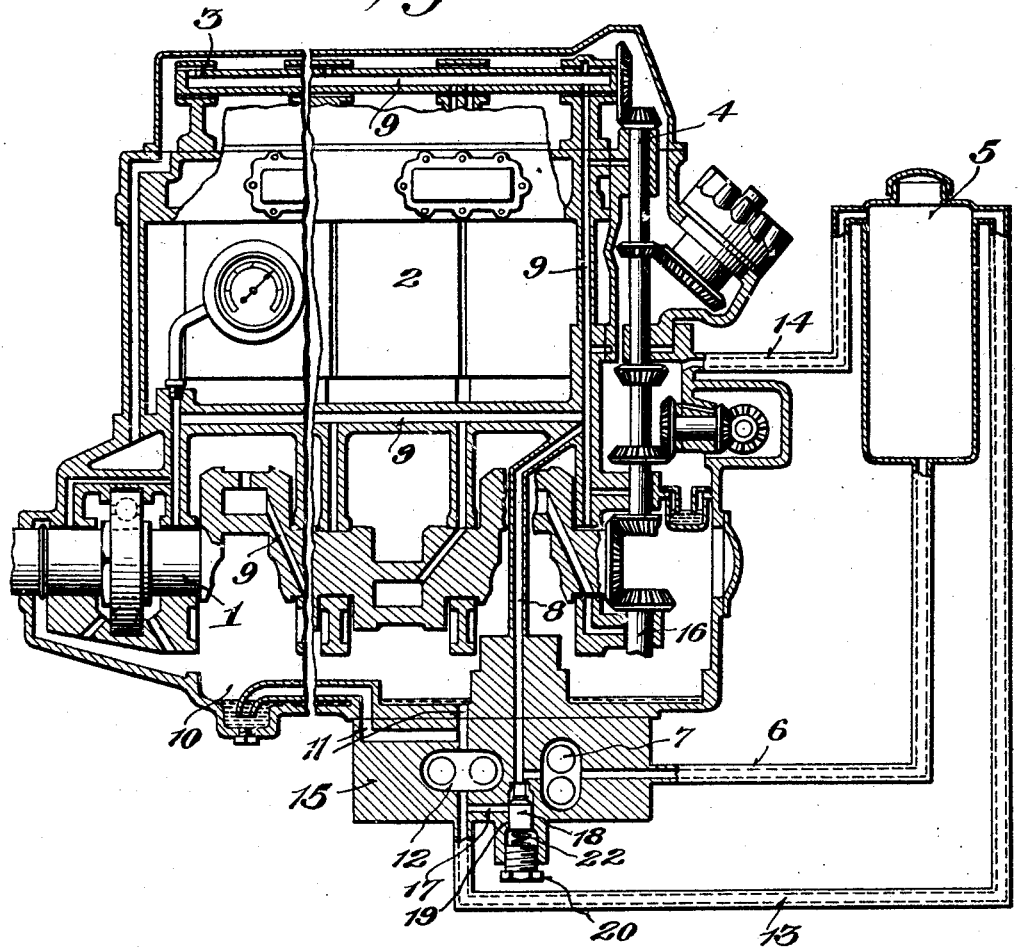
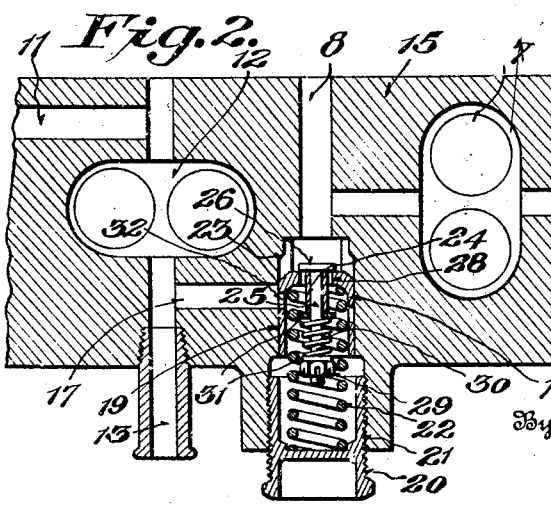
Inventor
Lionel M. Woolson,
By Mauro, Cameron, Lewis & Kerkam
Attorneys Patented Apr. 7, 1931

1,799,271

UNITED STATES PATENT OFFICE

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN

INTERNAL-COMBUSTION ENGINE

Application filed July 7, 1926. Serial No. 121,004.

This invention relates to lubricating systems and more particularly to lubricating systems for internal combustion engines.

In lubricating engines, particularly engines operating at high speeds such as airplane engines, it is desirable to provide lubricant circulating systems, including a suitable source of supply connected with the mechanism to be lubricated by means of suitable conduits, a feed pump normally interposed in said conduits between the supply tank and the engine to positively feed lubricant to the latter, and a discharge pump interposed between the engine and the supply tank for returning lubricant to the latter. Usually the discharge pump has greater capacity than the feed pump to thereby keep the crank-case substantially dry. In order to prevent the pressure of the lubricant delivered to the engine by the feed pump from becoming too great, it has heretofore been proposed to provide a relief valve connected to the feed line and to the engine, which valve is adapted to open when the pressure reaches a predetermined amount and to allow a part of the lubricant to escape to the crank-case. With such system, the capacity of the discharge pump must also be great enough to withdraw this additional amount of lubricant which has served no useful purpose in the lubrication system.

Moreover, the supply tank is usually of necessity connected with the feed and discharge pumps by conduits of some length, in which the lubricant rapidly congeals in cold weather when the engine is stopped. When the engine is started cold, the feed pump delivers very little lubricant to the engine because of this condition of the oil in the conduits, until the system is warmed up, and warming up is delayed by the lack of circulation of the lubricant. It has been found that bearings are frequently burned out under these conditions.

At the same time some lubricant remains in the crank-case from prior operation and with the short conduit connection to the discharge pump this lubricant will be withdrawn by the discharge pump even though it is partly congealed, and because of the more or less congealed condition of the lubricant in the conduit at the outlet side of this pump a high pressure is there built up.

One object of this invention is to provide a lubricating system which will eliminate the above disadvantages and will insure a proper supply of lubricant to the mechanism to be lubricated.

Another object is to provide means whereby a part of the lubricant when under excess pressure will be fed by the feed pump back into the supply tank, thereby decreasing the required capacity of the discharge pump with resultant economies in weight and cost.

A further object is to provide means for positively feeding lubricant to said mechanism when the engine is started cold.

A still further object is to provide means whereby the lubricant in the crank-case may be employed to lubricate the mechanism when the feed from the supply tank is insufficient.

Another object is to provide means whereby the discharge pump will be automatically connected with the mechanism to be lubricated under certain conditions of operation, to thereby deliver lubricant to said mechanism.

One embodiment of the invention is illustrated in the accompanying drawings, but these drawings are for purposes of illustration only and are not to be taken as a definition of the limits of the invention, reference being had to the appended claims for this purpose.

In the drawings:—

Fig. 1 shows diagrammatically one embodiment of the invention; and

Fig. 2 is a detail view of the pump unit shown in Fig. 1.

By way of example, the invention is illustrated in combination with an internal combustion engine of any suitable type, which, as shown, includes a crank shaft 1, cylinders 2, and cam shaft 3 operatively connected to the crank shaft 1 by means of a vertical shaft 4 and suitable gearing. A reservoir or tank 5 provides a source of lubricant supply and is preferably mounted on any suitable part of the engine supporting structure. Lubricant is fed from tank 5 through conduit 6 to a feed pump 7, preferably a gear pump of a suitable type, which pump feeds lubricant under pressure to the engine through feed conduit 8. A suitable circulating system, comprising a plurality of conduits 9 connected with said feed line 8, conducts lubricant to the various moving parts of the mechanism to be lubricated, from which the lubricant drains into the crank-case 10 of the engine. A conduit 11 connects both ends of the crank-case with a suction or discharge pump 12, preferably of the gear type, which returns lubricant through a conduit 13 to the tank 5. A vent pipe 14 preferably connects said tank with the casing of the engine.

Pumps 7 and 12 may be suitably mounted in a pump unit 15 which is attached to the engine casing, and are preferably operatively connected as by means of suitable gearing with a shaft 16 geared to the crank shaft 1.

In order to prevent the pressure of the lubricant delivered to the mechanism by the feed pump 7 from becoming too great, suitable means are provided whereby, above a certain pressure, a part of the lubricant is returned to the tank 5. In the form shown, said feed pump is connected by a conduit 17 with the return conduit 13, and a suitable valve 18 in said conduit is adapted to open when the pressure in the conduit 8 reaches a predetermined amount, said valve being preferably of a type more fully described hereinafter.

To prevent damage to the engine, in case of failure of the feed pump to deliver a proper supply of lubricant, the discharge pump 12 is adapted to return lubricant from the crank case to the mechanism to be lubricated instead of to the tank 5, and to this end is preferably connected by means of a suitable conduit with the feed line 8, said conduit having a valve therein adapted to open when the pressure of said discharge pump exceeds the pressure of said feed pump. In the form shown, the conduit 17 is employed for this purpose, and is provided with a valve which is adapted to open when the pressure in the conduit 13 reaches a predetermined point over that of conduit 8.

Fig. 2 shows one type of valve mechanism which may be employed for this purpose. The pressure relief valve 18 comprises a tubular valve member closed at one end and slidably mounted in a recess 19, formed in the pump unit 15, the conduit 17 being connected to one side of said recess. The outer end of said recess is closed by a plug 20 having threaded engagement 21 with the walls of said recess. Resilient means, such as a coil spring 22, are interposed between plug 20 and valve member 18 and normally maintain the latter in engagement with its seat 23. The tension of said spring may be adjusted by turning plug 20, so that when the pressure in feed line 8 reaches a predetermined amount, valve 18 will be forced down in recess 19 and will uncover conduit 17, placing conduit 8 in communication with return conduit 13.

Within said tubular member 18 and concentric therewith extends a post 24, mounted on the closed end of said member, and being hollow to slidably receive a valve stem 25 of a valve member 26. The latter is adapted to seat against the closed end of valve member 18 and to close a number of small ports 28 cut through said end. The inner end of valve stem 25 is threaded to receive a nut 29, and a coil spring 30 surrounds said stem, bearing at its ends by means of washers 31 against the nut 29 and the end of the post 24 and normally maintaining valve 26 closed. An opening 32 in one side of tubular member 18 is in registry with conduit 17 when said member 18 is in closed position. Lubricant under pressure from discharge pump 12 passes through conduit 17 and opening 32 to the interior of tubular member 18, and thence through ports 28 tends to open valve 26 against the pressure in feed line 8 and tension of spring 30. This tension may be adjusted by turning the nut 29.

The operation of the system will now be readily observed. During normal operation of the engine, lubricant is fed by feed pump 7 through the circulating system to the crankcase, and is returned by discharge pump 12 to the supply tank. When the pressure in the feed line reaches a predetermined amount, depending on the tension of spring 22, valve 18 is forced downward and part of the lubricant is fed by the feed pump through return pipe 13 to the supply tank, without passing through the discharge pump.

Now, with the engine cold and oil congealed in pipes 6 and 13, the engine is started and the pump 7 is ineffectual in drawing oil in any quantity from the tank 5. The pump 12, however, will immediately draw some oil from the crank-case, due to the short pipe connection and to the better protection of the crank-case oil, and this will create a high pressure on the outlet side of the pump 12 because of the resistance caused by the congealed oil in the pipe 13. There is then less pressure in the pipe 6 than in the pipe 13 and this will cause the valve 26 to be raised from its seat and oil will flow through the conduit 17, the ports 32 and 28 and into the conduit 8 by which it is carried to the various bearings of the engine. This flow of oil will continue until the pump 7 begins to draw oil in quantity from the tank 5 and thereby create a pressure in the conduit 8 greater than that in the pipe 13, and at that time the valve 26 will automatically close and the system will operate in the normal manner described above. That is, the system will thereafter operate by the pump 12 withdrawing oil from the crankcase and delivering it to the tank 5, and the pump 7 will withdraw oil from the tank 5 and deliver it to the engine bearings under pressure, the upper limit of which is determined by the by-pass valve 18.

The invention thus insures against failure of a proper supply of lubricant to the engine and prevents consequent damage. It is, moreover, automatic in operation, simple and efficient, and economical to manufacture and install. It is to be expressly understood, however, that the invention is not limited to the embodiment illustrated, but is susceptible of a variety of expressions, and that changes may be made in the construction and arrangement of the parts without departing from the spirit of the invention. Reference is therefore to be had to the appended claims for a definition of the limits of the invention.

What is claimed is:—

1. The combination with mechanism to be lubricated, of a lubricating system having a feed pump, a discharge pump, a conduit connecting the discharge sides of said pumps, and pressure-operated means controlling the direction of flow in said conduit.

2. In an internal combustion engine, a lubricating system having a source of lubricant supply, a pump feeding lubricant from said source to said engine, a positively actuated discharging means between the crank-case of said engine and said source of supply, a by-pass connecting said pump with said discharging means, and a pressure relief valve in said by-pass opening toward the feed pump.

3. The combination with mechanism to be lubricated and a source of lubricant supply, of conduits connecting said elements and constituting therewith a closed circulating system, feed and discharge pumps in said system, a conduit connecting the discharge sides of said pumps, and a pressure-operated valve in said conduit adapted to open when the differential of pressure between said pumps reaches a predetermined amount in either direction.

4. The combination with mechanism to be lubricated and a source of lubricant supply, of a pump feeding lubricant from said source of supply to said mechanism, a pump returning lubricant from said mechanism to said source of supply, a pressure relief valve interposed between said pumps, and pressure-operated means forming part of said valve and adapted to open when the pressure of said returning pump is greater than the pressure of said feeding pump.

5. In an internal combustion engine, a lubricating system having a source of supply, a pump feeding lubricant from said source to said engine, a pump discharging lubricant from said engine to said source, and a pair of pressure-controlled valves interposed between said pumps, one of said valve being adapted to open when the pressure of said feeding pump exceeds a predetermined amount, and the other when the pressure of said discharging pump is greater than the pressure of said feed pump by a predetermined amount.

6. In an internal combustion engine, a lubricating system having a source of supply, a pump feeding lubricant from said source to said engine, a pump discharging lubricant from said engine to said source, a conduit connecting said pumps, and a reversely-operating pressure-actuated valve in said conduit.

7. In an internal combustion engine, a lubricating system having a source of supply, conduits connecting the latter with said engine to constitute a circulating system, a feed pump and a discharge pump in said system, a conduit connecting said pumps, and a pressure-actuated valve in said conduit adapted to open when the pressure of said discharge pump exceeds the pressure of said feed pump by a predetermined amount.

8. In combination with mechanism to be lubricated and a source of lubricant supply, conduits including feed and discharge pumps connecting said elements and forming therewith a circulating system, and valve means between said pumps opened by back pressure created in a portion of said system by said discharge pump.

9. In an internal combustion engine, a lubricating system having a source of lubricant supply, a conduit connecting the latter with said engine and including a feed pump, a conduit connecting said engine with said source of supply and including a discharge pump, and pressure-operated valve means connecting said conduits and adapted to supply lubricant from said discharge pump to said engine, said means being actuated by back-pressure created by said discharge pump between the latter and said source of supply.

10. In an internal combustion engine, the combination with a closed lubricant circulating system having a source of supply, feeding means connecting said source with said engine, and positively actuated discharging means connecting said engine with said source, of a pressure-controlled by-pass valve between said discharging means and said engine, said valve being adapted to open when lubricant in part of said system is congealed.

11. In an internal combustion engine, a lubricating system having a source of lubricant supply, means including feed and discharge pumps operatively connecting said source of supply with said engine and forming a closed circulating system, and a pair of normally closed valves interposed between said pumps, one of said valves being adapted to open when the differential pressure of said feed pump reaches a predetermined value over the discharge pump pressure and the other when the differential pressure of said discharge pump reaches a predetermined amount over the feed pump pressure.

12. In an internal combustion engine, a lubricating system comprising a source of lubricant supply, a conduit connecting the latter with said engine, said conduit including feed and discharge pumps for the circulation of lubricant, a conduit connecting said pumps, a valve member in said conduit adapted to open when the differential pressure in one direction reaches a predetermined amount, and a second valve member forming part of said first-named valve member and adapted to open when the differential pressure in the opposite direction reaches a predetermined amount.

13. In an internal combustion engine, a lubricating system comprising a source of lubricant supply, a conduit connecting the latter with said engine, said conduit including a feed pump and a discharge pump for the circulation of lubricant, a conduit connecting said pumps, a valve in said conduit, a second valve forming part of said first-named valve, and resilient means normally closing said valves, one of said valves being adapted to open when the pressure in one direction in said conduit exceeds the pressure in the other direction by a predetermined amount.

14. In an internal combustion engine, a lubricant circulating system including feed and discharge pumps, a source of lubricant supply, an external circuit connecting said supply and pumps, and means including a shunt circuit within the body of the engine and connected to said discharge pump for supplying lubricant to the engine bearings.

15. In an internal combustion engine, a source of lubricant supply, a supply pump for forcing lubricant to the engine from said supply, a discharge pump for forcing lubricant from said engine to said supply, a conduit connecting said pumps, and means controlled by the discharge of one of said pumps for controlling the flow of lubricant through said conduit.

In testimony whereof I have signed this specification.

LIONEL M. WOOLSON.